(12) United States Patent
Blumrich et al.

(10) Patent No.: US 10,443,441 B2
(45) Date of Patent: Oct. 15, 2019

(54) VALVE DEVICE AND JET ENGINE WITH A VALVE DEVICE

(71) Applicant: Rolls-Royce Deutschland Ltd & Co KG, Blankenfelde-Mahlow (DE)

(72) Inventors: Markus Blumrich, Berlin (DE); Michael Klingsporn, Stahnsdorf (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 380 days.

(21) Appl. No.: 15/336,264

(22) Filed: Oct. 27, 2016

(65) Prior Publication Data

US 2017/0145858 A1    May 25, 2017

(30) Foreign Application Priority Data

Nov. 20, 2015  (DE) .......................... 10 2015 120 192

(51) Int. Cl.
*F01D 25/18* (2006.01)
*F01D 25/20* (2006.01)
(Continued)

(52) U.S. Cl.
CPC ............ *F01D 25/18* (2013.01); *F01D 25/20* (2013.01); *F02K 9/58* (2013.01); *F16K 1/38* (2013.01);
(Continued)

(58) Field of Classification Search
CPC . F01D 25/18; F01D 25/20; F02K 9/58; F16K 1/38; F16K 15/025; F16K 15/18;
(Continued)

(56) References Cited

U.S. PATENT DOCUMENTS 2,672,278 A   3/1954 Newcomb
2,952,329 A   9/1960 Cunningham et al.
(Continued)

FOREIGN PATENT DOCUMENTS

DE   1600870 A1   7/1970
DE   19732367     2/1999
EP   2902691 A1   8/2015

OTHER PUBLICATIONS

German Search Report dated Jul. 29, 2016 from counterpart German App No. 10 2015 120 192.5.
(Continued)

*Primary Examiner* — Marina A Tietjen
*Assistant Examiner* — Frederick D Soski
(74) *Attorney, Agent, or Firm* — Shuttleworth & Ingersoll, PLC; Timothy J. Klima

(57) ABSTRACT

A valve device of a jet engine includes a body, a seat and a flow path between an inlet and an outlet that can be closed and opened. Depending on an actuating force that results from a fluid pressure at a front surface of the body facing the inlet, as well as from a closing force applied to the body, the body can be transferred between open and closed states, and can be transferred into an operational state in which the flow path is opened by a setting device depending on an ambient pressure. The flow path can be opened via the setting device such that a flow cross-section of the flow path corresponds to at least 80% of the flow cross-section of the flow path in the area of the inlet across the entire extension of the flow path between the inlet and the outlet.

11 Claims, 15 Drawing Sheets

(51) Int. Cl.
*F02K 9/58* (2006.01)
*F16K 17/04* (2006.01)
*F16K 1/38* (2006.01)
*F16K 15/02* (2006.01)
*F16K 15/18* (2006.01)
*F16N 19/00* (2006.01)

(52) U.S. Cl.
CPC ............ *F16K 15/025* (2013.01); *F16K 15/18* (2013.01); *F16K 17/0466* (2013.01); *F05D 2260/605* (2013.01); *F05D 2260/608* (2013.01); *F05D 2260/609* (2013.01); *F16N 19/003* (2013.01)

(58) Field of Classification Search
CPC ........... F16K 17/0466; F05D 2260/605; F05D 2260/608; F05D 2260/609; F16N 19/003
See application file for complete search history.

(56) References Cited

U.S. PATENT DOCUMENTS

| | | |
|---|---|---|
| 3,572,356 A | 3/1971 | Pinto |
| 3,620,501 A * | 11/1971 | Friedell .................... F16K 1/34 251/333 |
| 4,995,589 A | 2/1991 | Adishian et al. |
| 6,158,423 A | 12/2000 | Haack |
| 2010/0282991 A1* | 11/2010 | Okamoto ............ F16K 31/0655 251/129.15 |

OTHER PUBLICATIONS

European Search Report dated Mar. 16, 2017 for counterpart European Application No. 16195455.7.

* cited by examiner

VALVE DEVICE AND JET ENGINE WITH A VALVE DEVICE

This application claims priority to German Patent Application DE102015120192.5 filed Nov. 20, 2015, the entirety of which is incorporated by reference herein.

The invention relates to a valve device as disclosed herein. Further, the invention relates to a jet engine with such a valve device.

Among other things, known jet engines comprise an oil tank and an oil pump that is connected to the oil tank, for example in order to be able to apply lubricating oil to the bearings that are arranged inside bearing chambers. During the operation of a jet engine, a gaseous air-oil mixture carrying oil droplets forms inside the bearing chambers during the lubrication of the bearings. The air-oil mixture is conducted from the bearing chambers into the oil tank and from there is introduced via a conduit into an oil separator or a so-called breather. In the area of the oil separator that may for example be embodied as a centrifugal separator, oil and air are separated from each other again, and the oil that is separated in the area of the oil separator or the appliance for separating oil droplets is conducted back into the oil circuit. In contrast, the air that is cleaned in the area of the oil separator is discharged into the environment.

In order to ensure that the oil pump can be operated with a sufficient conveying capacity, a defined minimum pressure has to be ensured on a suction side of the oil pump which is connected to the oil tank. In order to be able to supply a minimum pressure in the area of the oil tank and thus on the suction side of the oil pump also during a flight operation of an aircraft, even when the ambient pressure is below the minimum pressure, a spring-loaded valve device is arranged inside the conduit via which the air-oil mixture is conducted from the oil tank to the oil separator. A spring force of a spring appliance defines a pick-up threshold of the valve device. The pick-up threshold of the valve device is set in such a manner that an air-oil volume flow can only be conducted via the valve device from the oil tank in the direction of the oil separator when a defined limiting pressure is exceeded in the interior space of the oil tank. Via such a valve device, the pressure on the suction side of the oil pump is supposed to be set to a level above the minimum pressure across the entire operating range of an aircraft.

During the operation of a jet engine, oil droplets that are present in the air-oil volume that is conducted through the valve device are dissipated or atomized into oil droplets with small droplet diameters as they flow through the valve device. Disadvantageously, the small oil droplets that are exiting the valve device in the area of the centrifugal separator that is provided downstream of the valve device can be separated from the air-oil volume flow only to a limited degree due to their small droplet size, which is why the exhaust air that is flowing out from the oil separator in the direction of the environment of a jet engine embodied with an oil separator has an undesirably high oil load. The undesirably high oil load of the exhaust air causes an oil mist that is discharged from a jet engine and that may be misinterpreted as a trail of smoke resulting from an engine burn, and can thus cause some irritation. Moreover, the oil loss of a jet engine caused by a reduced separation performance is undesirably high.

What is known from U.S. Pat. No. 3,572,356 A is a jet engine with an auxiliary device gear, wherein an oil pump and an oil tank are arranged in the area of the auxiliary device gear. By means of the oil pump, an oil lubricating jet can be applied to the bearings through a pipe. Further, a valve is provided via which an interior space of the auxiliary device gear can be de-aired into the atmosphere. During a flight operation of an aircraft, a spring appliance principally holds the valve body of the valve in a position that corresponds to a closed operational state of the valve. If a pressure in the interior space of the auxiliary device gear exceeds a spring force of the spring appliance, the valve opens and the interior space of the auxiliary device gear is connected to the atmosphere via the valve and is de-aired. Further, the valve has a bellows with a hollow space which is at least partially evacuated and via which the valve is transferred into a principally opened state during an operation of an aircraft in a low flying altitude or on the ground, when an ambient pressure of an aircraft approximately corresponds to the atmospheric pressure at sea level. In this manner it is avoided that during operation of the jet engine a pressure inside the bearing chamber rises to a value at which oil exits from the bearing chambers through adjacent seals and an undesired pollution of the air that is supplied to an aircraft cabin occurs.

It is the objective of the present invention to provide a valve device of a jet engine and a jet engine with such a valve device, by means of which a high separation performance of an oil separator is achieved.

This objective is achieved by a valve device or a jet engine with features as disclosed herein.

The valve device according to the invention, which can preferably be used in an air-oil system of a jet engine, comprises a valve body which acts together with the valve seat and via which a flow path for an air-oil volume flow carrying oil droplets can be closed and at least partially opened between a valve inlet and a valve outlet. Depending on an actuating force that acts on the valve body as a function of the operational state and that results from a fluid pressure that is applied in the area of a front surface of the valve body that is facing the valve inlet, as well as from a closing force that is applied to the valve body and by means of which the valve body can be actuated in the direction of an operational state in which the flow path is closed, the valve body can be transferred between operational states in which the flow path is closed and in which the flow path is at least partially opened. Further, the valve body can be transferred by a setting device into an operational state in which the flow path is opened, depending on an ambient pressure and independently of the resulting actuating force that is respectively applied to the valve body.

Since oil droplets with droplet diameters that are smaller than a defined droplet diameter cannot be separated or cannot be separated to a desired degree from the air-oil volume flow or the air-oil mixture inside an oil separator, in the valve device according to the invention, the flow path can be opened at least via the setting device to such a degree that the flow cross-section of the flow path corresponds to at least 80% of the flow cross-section of the flow path in the area of the valve inlet across the entire extension of the flow path between the valve inlet and the valve outlet.

In this way it is avoided the air-oil mixture that flows through the valve device is accelerated in the area of the valve device to an undesired degree with respect to a velocity of the air-oil mixture in the area of the valve inlet. The invention is based on the insight that an excessively high acceleration of the air-oil mixture in the area of the valve device causes an undesirable atomization of the oil droplets that are carried along in the air-oil mixture and has a negative impact on the separation performance of an oil separator arranged downstream of the valve device.

By means of the valve device according to the invention, it is achieved in a constructionally simple manner that during operation of the valve device according to the invention oil droplets that are carried along in an air-oil mixture flowing through the flow path are atomized or reduced in size to a minimum degree, and that a separation performance of an oil separator that is arranged downstream of the valve device is high.

On the one hand, it is facilitated by the valve device according to the invention in a constructionally simple manner that droplet sizes of oil droplets of an air-oil mixture that are conveyed through the valve device are not reduced in the area of the valve device to a degree that has a negative impact on a separation performance of a downstream oil separator in the event that an operational state of the valve body is present in which the flow path is at least partially opened, and in which the flow path is opened by means of an actuation of the valve body through the setting device depending on the ambient pressure, also without a fluid pressure of an air-oil mixture being applied to the valve body.

On the other hand, with the valve device according to the invention, a minimum pressure that is sufficient for a desirably high conveying capacity of an oil pump can be supplied to a desired degree on a suction side of an oil pump of a jet engine during the flight operation of a jet engine of an aircraft. For this purpose, in flight operation there is no actuation of the valve body by the setting device, acting in the opening direction of the valve device, if correspondingly low environment pressures are present, and the fluid pressure at the side of the valve inlet is ensured to be above the minimum pressure to a desired degree with low actuating effort, depending on the resulting actuating force that is respectively applied to the valve body as a function of the operational state.

By means of the valve device according to the invention, the exit of oil mist from a jet engine of an aircraft is avoided at low flying altitudes or on the ground in a cost-effective manner, and an oil consumption of a jet engine as well as pollution of a housing of a jet engine is also reduced as compared to solutions that are known from the state of the art, and a conveying capacity of an oil pump is ensured at higher flying altitudes.

Here, it is possible in an embodiment of the valve device according to the invention that is constructionally simple and can be operated with little actuating effort, that a spring force is applied to the valve body via a spring appliance, with the spring force acting in the direction of its closed position.

It is particularly advantageous if the flow path can be opened at least via the setting device to such an extent that the flow cross-section corresponds to at least 100% of the flow cross-section of the flow path in the area of the valve inlet between the valve inlet and the valve outlet across the entire extension of the flow path. In such an embodiment of the valve device according to the invention, an atomization of oil droplets of an air-oil mixture that is conducted through the valve device is particularly small in the area of the valve device, since no acceleration of the air-oil mixture occurs in any part of the valve device with respect to a velocity in the area of the valve inlet.

In an advantageous embodiment of a valve device according to the invention, in particular all those areas of the valve body and/or of the valve seat that are delimiting the flow path respectively have a radius of curvature that has a value that respectively corresponds to at least the one hundred fiftieth fraction of the value of the flow cross-section of the flow path in the area of the valve inlet. In this way, it is achieved in a simple manner that the air-oil mixture that is conducted through the valve device is not subjected to an undesirably strong deflection and that no stalls are created due to which oil droplets conducted inside the air-oil mixture are in turn reduced in size. Particularly all those structural components of the valve appliance that are adjoining the flow path are embodied with radii that are as large as possible or preferably with planar surfaces that have indefinite radii.

A particularly low degree of atomization of oil droplets of an air-oil mixture that is conducted through the valve device is achieved if the radii of curvature are respectively at least 1.5 mm in size.

An atomization of oil droplets of an air-oil mixture that is conducted through the valve device is particularly small in particular in the area of the valve body if the front surface of the valve body that is facing towards the valve inlet has a surface that is embodied so as to be at least approximately spherical at least in certain areas.

In an advantageous embodiment of the valve device according to the invention, a more advantageous flow control of the air-oil mixture is achieved by providing a wall that surrounds the valve body and the valve seat at least in certain areas and that is configured with outlet openings that are arranged downstream of the valve seat with respect to the valve inlet and that are arranged at a distance from each other in the circumferential direction.

In an advantageous embodiment of a valve device according to the invention, the wall is arranged radially inside a housing that is arranged coaxially with respect to the wall, and is arranged at a distance to the housing in the radial direction, wherein the housing has at least one discharge opening of the valve outlet. A valve device that is embodied in such a way can be mounted in a simple manner, wherein the wall that surrounds the valve body and the valve seat can be inserted into the housing in a simple manner. The wall as well as the housing in particular have a substantially circular cross-section, wherein a distance between the wall and the housing is substantially constant in the circumferential direction of the valve device. The discharge opening of the valve outlet can be brought into operative connection with a conduit, via which an air-oil mixture that is conducted through the valve device is conducted in the direction of a separation appliance, in a simple manner.

In order to be able to shift the valve device in a simple manner between a basic position in which the flow path is closed without pressure acting on the valve body and the operational state in which the flow is closed, the setting device can have a setting element which can be shifted between a first position and a second position and which acts together with the valve body, wherein, in the first position of the setting element, the valve body can be transferred into an operational state in which the flow path is closed, while in the second position of the setting element the valve body is transferred into an operational state in which the flow path is opened.

In a further advantageous embodiment of a valve device according to the invention, an actuator is provided by means of which the setting element can be shifted between the first position and the second position. In addition, a further spring appliance can be provided which applies a force to the setting element in the direction of the first position or in the direction of the second position, so that the setting element is in the first position or in the second position without the actuator being actuated.

In an embodiment of the valve device according to the invention that can be realized in a constructionally simple manner, the setting element can be shifted electromagnetically by means of the actuator. In principle, also various other actuating mechanisms can be provided for shifting the setting element between the first position and the second position.

In a further advantageous embodiment of the valve device according to the invention, the setting device is embodied with a bellows that delimits an air-tight hollow space, wherein a height of the bellows varies in the setting direction of the valve body depending on an ambient pressure of the bellows. The bellows is preferably connected to the setting element on the one side and to the wall of the valve device on the other, with the wall of the valve device being arranged on a side of the setting element that is facing away from the valve body. The bellows is in particular embodied in such a manner that it changes an extension in the movement direction of the valve body in the event that an external pressure changes, and that in this way the setting element is shifted between its first position and in the direction of its second position, and that consequently, due to the coupling of the valve body to the setting element, the valve body is shifted between its basic position, in which the valve body abuts at the valve seat in a sealing manner and closes the flow path, and its operational state, in which the flow path is opened.

In an advantageous embodiment of the valve device according to the invention, the setting device has a pressure chamber to which compressed air can be applied and which is delimited by a setting element at least in certain areas. In particular in the event that a limiting pressure inside the pressure chamber is exceeded, the setting element can be shifted between its first position and its second position. The pressure chamber is preferably arranged on a side of the setting element that is facing away from the valve body and can for example be supplied with high-pressure air that is present inside the jet engine.

In order to ensure in a simple manner that the valve body is principally in the operational state in which the flow path is opened, a spring force of a spring appliance, which is acting in the direction of the second position of the setting element, can be applied to the setting element of the setting device. As an alternative hereto, it can also be provided that the spring appliance applies a spring force to the setting element, thus pressing the setting element in the direction of its first position.

What is further proposed is a jet engine with an appliance for separating oil droplets from an air-oil volume flow, which is embodied with a tank device and with a valve device that is arranged in the area of the tank device, wherein an air-oil volume flow can be introduced into the valve device via the valve inlet of the valve device and can be conducted via a conduction device from the valve outlet of the valve device to the appliance for separating oil droplets.

The jet engine according to the invention has the advantage that it is characterized by a good separation performance when it comes to separating oil from the air-oil volume flow or the air-oil mixture that is supplied to the appliance for separating oil droplets or to the separating device. This is due to the fact that oil droplets of the air-oil mixture that is conducted through the valve device are not atomized to an undesired extent in the area of the valve device, i.e. they are not strongly reduced in size if the valve body is present in the operational state in which the flow path is opened.

Since larger oil droplets can be separated from the air-oil mixture better than smaller oil droplets in the area of the separating device, the cleaned air advantageously has a smaller oil load downstream of the separating device, so that the formation of an oil mist that is flowing out of the jet engine is reduced. In addition, thanks to the enhanced separation performance, an oil loss of the jet engine is advantageously reduced, as is the danger of a pollution of an engine shroud.

Additionally, in the jet engine according to the invention, a functionality of the oil pump is ensured in an advantageous manner in all operational states of an aircraft that is embodied with a jet engine according to the invention. When an aircraft that is embodied with an aircraft engine is operated on the ground or in low flying altitude, a pressure inside the tank device or inside the oil tank is sufficiently high due to the ambient pressure of the aircraft that in this case corresponds to the atmospheric pressure that is present at sea level, so that it is insignificant for the functionality of the oil pump whether the valve body is in an operational state in which the flow path is opened. During flight operation at higher flying altitudes, where the ambient pressure of an aircraft is below the minimum pressure that is necessary for the operation of an oil pump, a pressure above the minimum pressure is created in the interior space of the tank device in a simple manner and to a desired degree if the valve device is correspondingly designed, whereby an operation of the oil pump is reliably ensured across the entire operating range of an aircraft.

In a simple embodiment of the invention, the conduction device for conducting the air-oil mixture from the valve outlet of the valve appliance to the separating device is formed as a conduit.

The features specified in the patent claims as well as the features specified in the following exemplary embodiments of the valve device according to the invention or of the jet engine according to the invention are respectively suitable on their own or in any combination with each other to further develop the subject matter according to the invention.

Further advantages and advantageous embodiments of a valve device according to the invention or of a jet engine according to the invention follow from the patent claims and the exemplary embodiments that are described in principle in the following by referring to the drawings, wherein, with a view to clarity, the same reference signs are used for structural components having the same design and functionality.

Herein:

Figure 5:
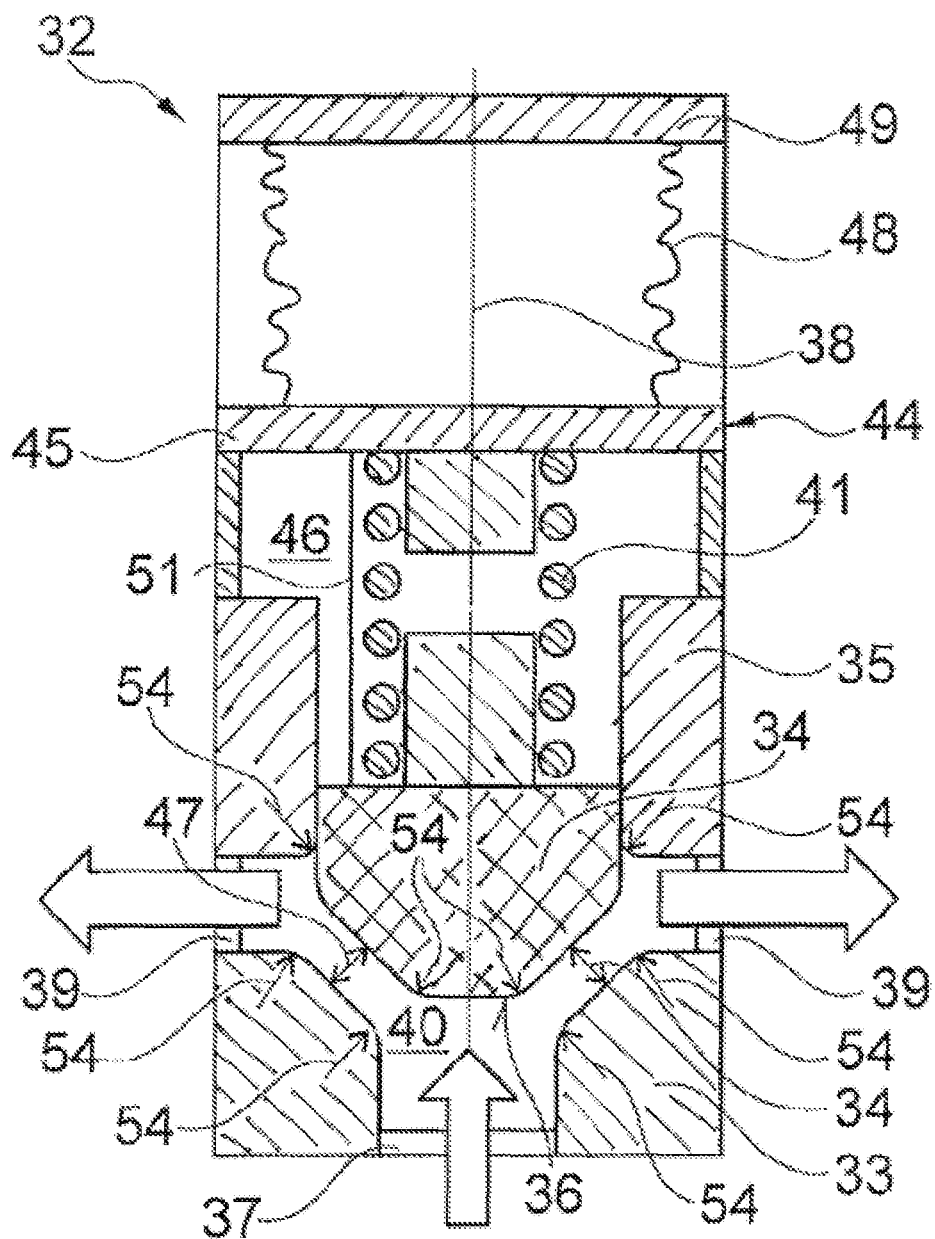
FIG. 5 shows a rendering of the valve device that corresponds to FIG. 4, wherein the valve body is shown in an operational state in which the flow path is at least partially opened, or where it is in an open position.
Figure 6:
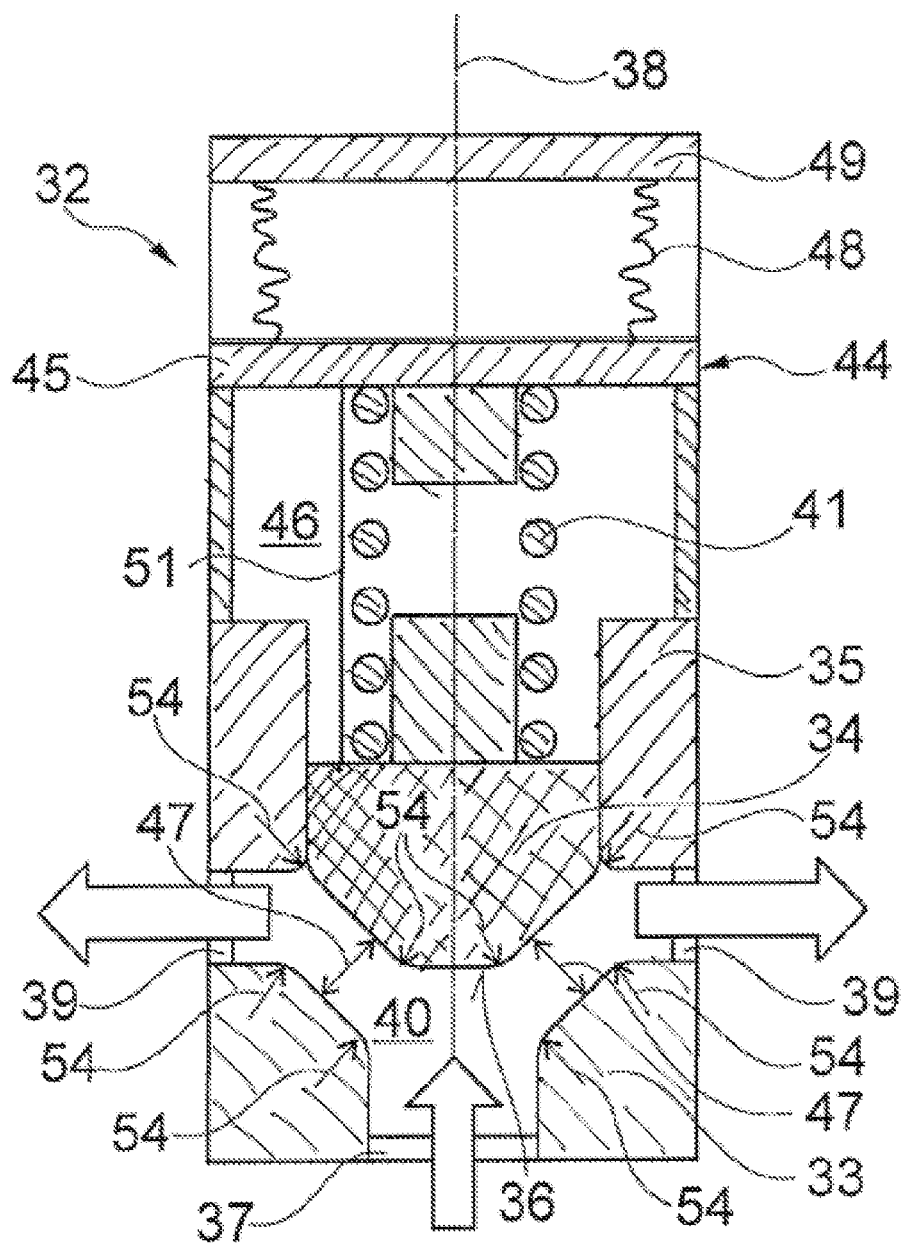
FIG. 6 shows a rendering of the valve device that corresponds to FIG. 3 and FIG. 4, wherein the valve body is shifted by a setting device into an operational state in which the flow path is opened, or into an open position.
Figure 7:
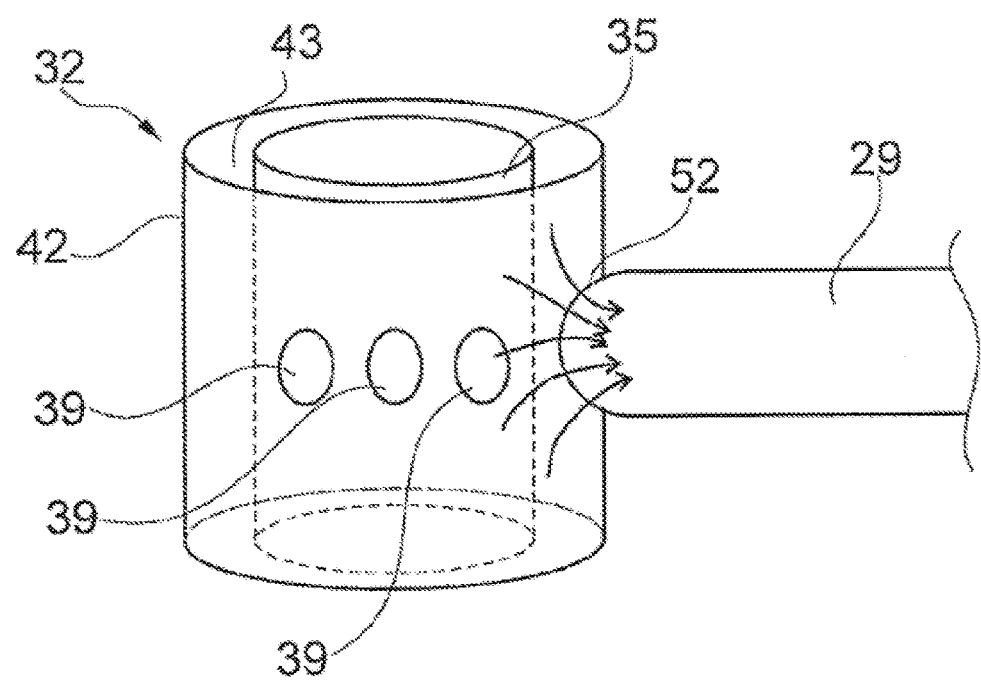
FIG. 7 shows a schematic three-dimensional view of the valve device, wherein a wall of the valve device is arranged at a distance from a housing of the valve device.
Figure 8:
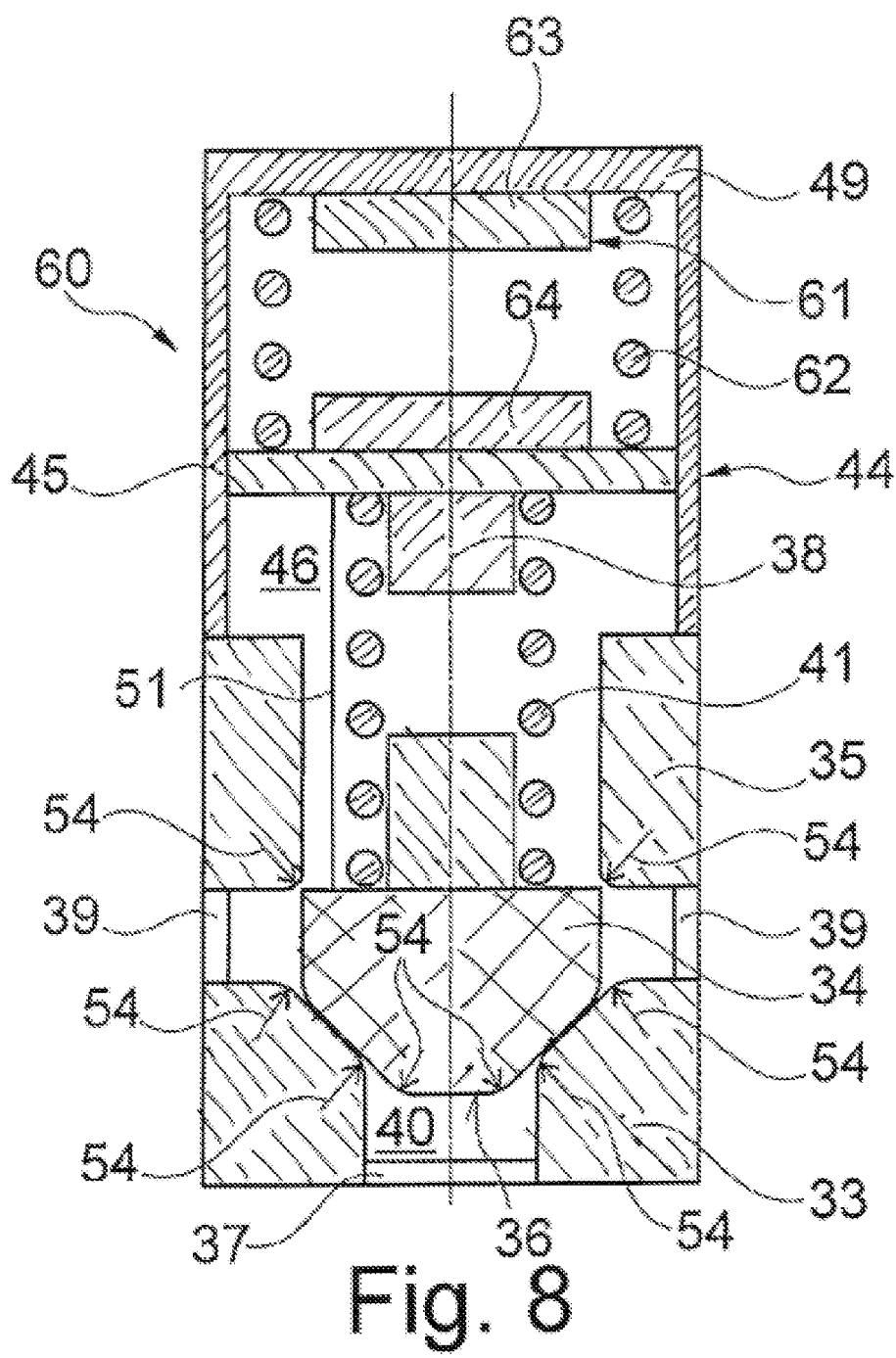
Figure 9:
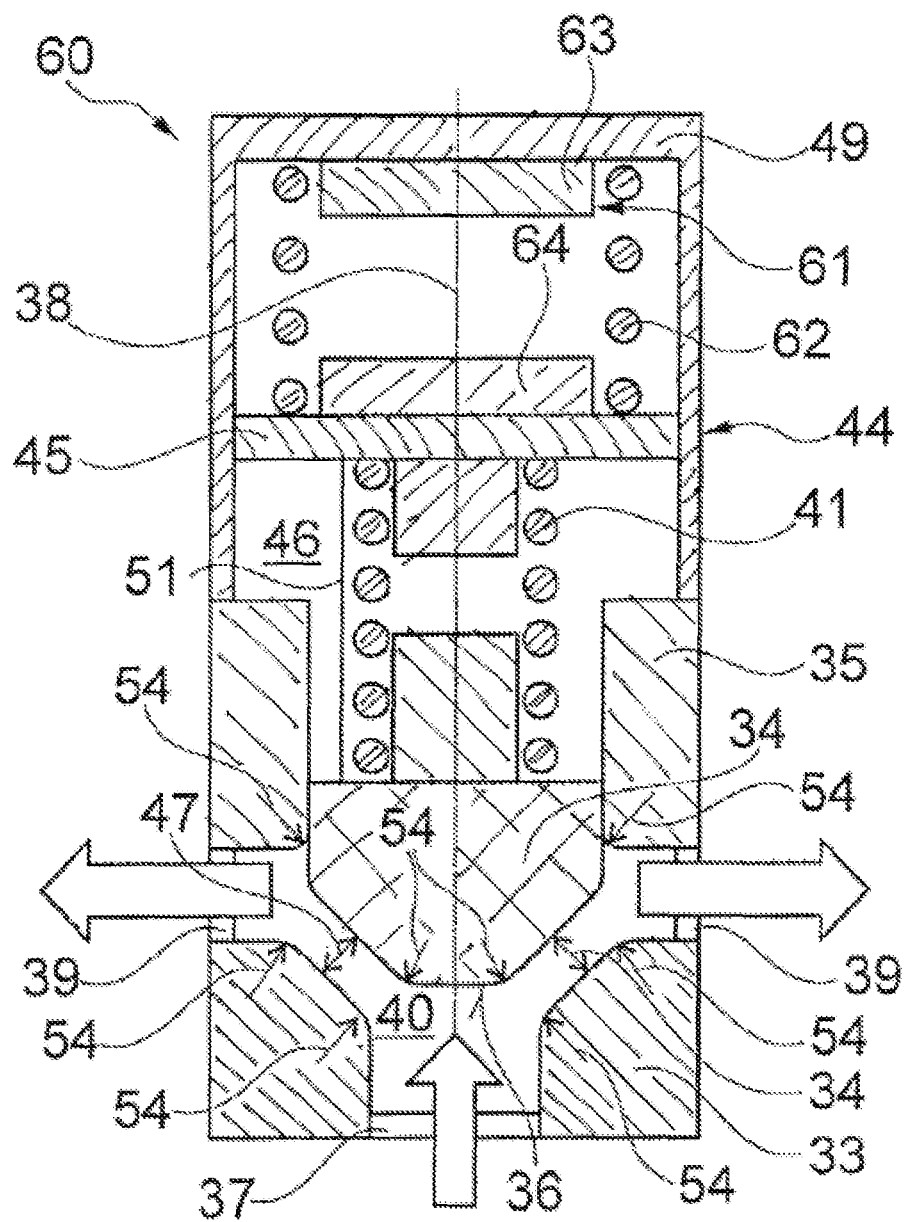
Figure 10:
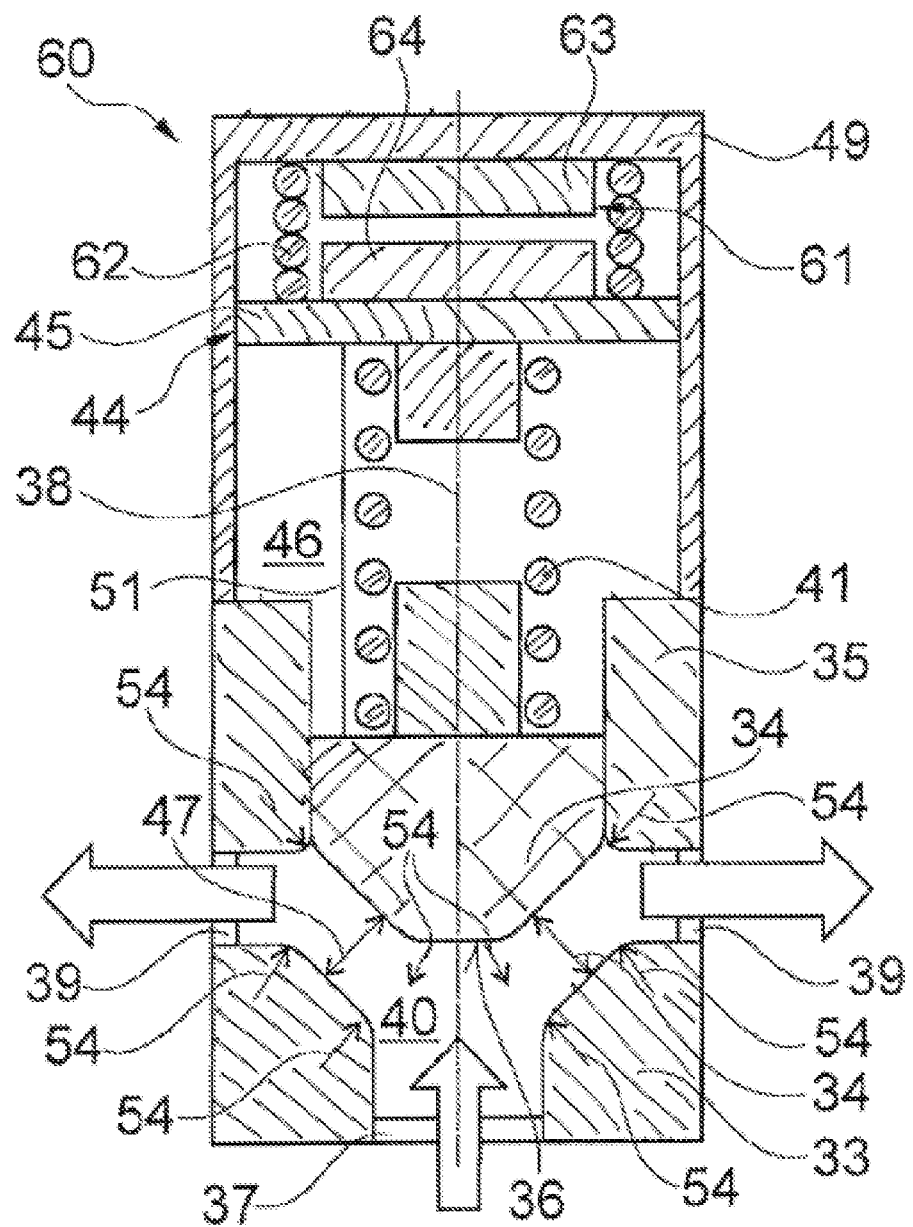
Figure 11:
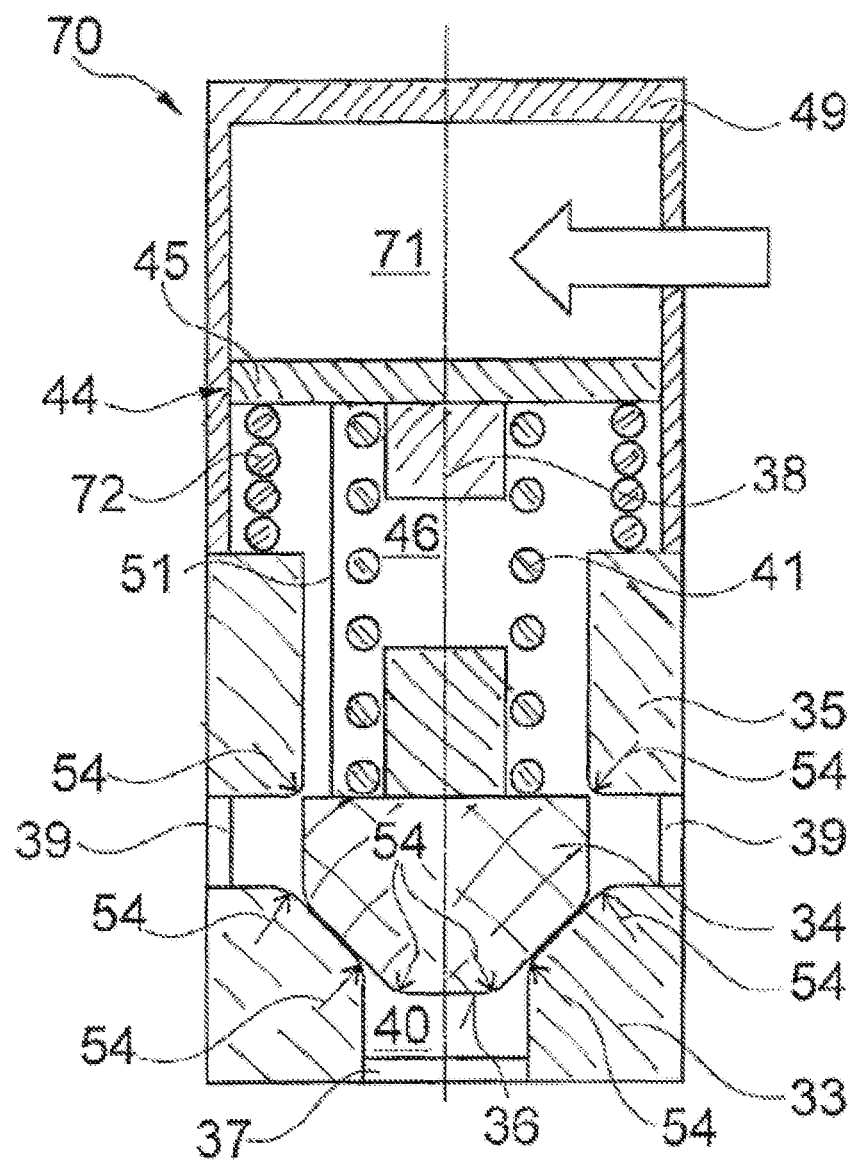

FIGS. 8 to 10 show simplified sectional views of an alternatively embodied valve device, wherein the valve body of the valve device is shown in positions that correspond to those in FIG. 5 to FIG. 7; and FIG. 11 *a*. 12 show simplified sectional views of another alternatively embodied valve device, wherein the valve body of the valve device is shown in positions that correspond to those shown in FIG. 5 and FIG. 7 or FIG. 8 and FIG. 10.

Figure 1:
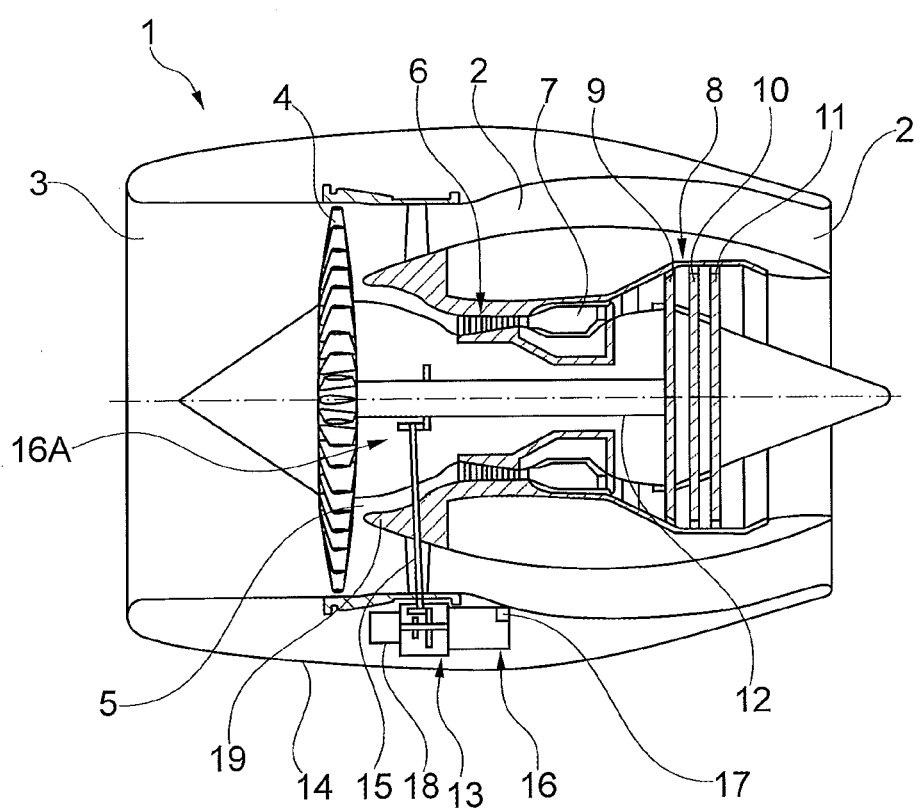
FIG. 1 shows a strongly schematized longitudinal section view of an aircraft engine with an auxiliary unit gear appliance that is arranged inside the fan housing, having an air-oil system that comprises a tank device, a separating device and a valve device.

FIG. 1 shows an aircraft engine or jet engine 1 in a longitudinal section view. The jet engine 1 is embodied with a bypass flow channel 2 and an inlet area 3, wherein a fan 4 connects to the inlet area 3 downstream in a per se known manner. Downstream of the fan 4, the fluid flow in the jet engine 1 is divided into a bypass flow and a core flow, wherein the bypass flow flows through the bypass flow channel 2 and the core flow flows into an engine core 5, which again is embodied in a per se known manner with a compressor appliance 6, a burner 7 and a turbine device 8.

In the present case, the turbine device 8 has three rotor devices 9, 10 and 11, which are configured in a substantially comparable design and are connected to an engine shaft 12.

The jet engine 1 is embodied with an auxiliary unit gear appliance 13 in an outer engine shroud 14 that delimits the bypass flow channel 2 and represents the outer circumferential area of the jet engine 1. In the present case, the auxiliary unit gear appliance 13 is connected to the engine shaft 12 via a drive shaft 15 that is extending in the radial direction of the jet engine 1 and via an inner gear 16A, and is thus driven or provided with a torque by the engine shaft 12 during operation of the jet engine 1. The auxiliary unit gear appliance 13 supplies different auxiliary units 16 and an appliance for separating oil droplets from an air-oil volume flow that is embodied as an oil separator 17, which is also referred to as a breather, with a torque to a desired degree. In addition, in the area of the auxiliary unit gear appliance 13, also a tank device 18 is provided that represents a hydraulic fluid reservoir from which oil for cooling and lubricating various areas of the aero engine 1, such as bearing appliances, gear wheel pairs of the inner gear 16A and the auxiliary unit gear appliance 13 as well as further assembly groups of the aero engine 1 that need to be cooled and lubricated, is extracted.

Figure 2:
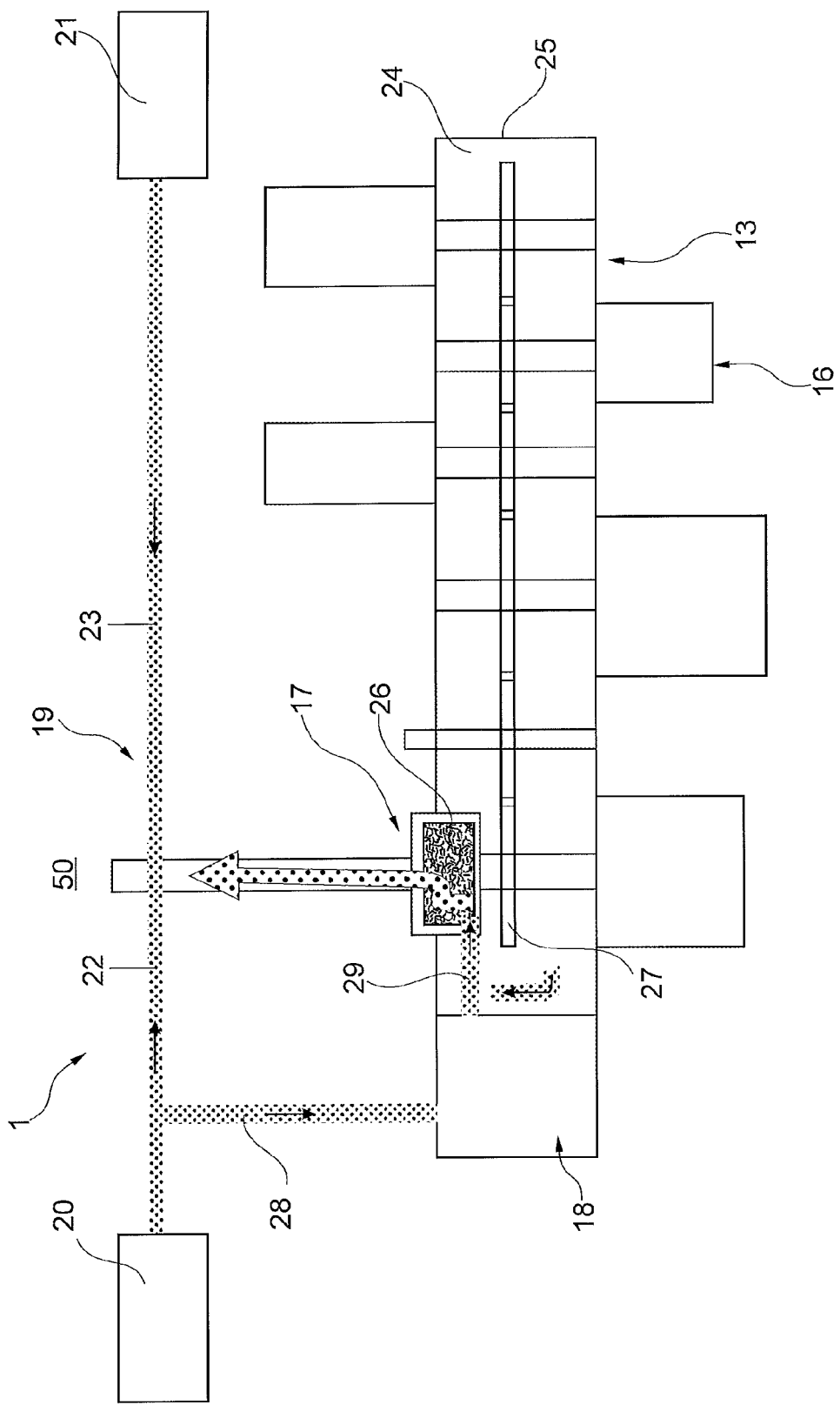
FIG. 2 shows a strongly schematized partial rendering of the aircraft engine according to FIG. 1, wherein sections of the air-oil system can be seen in more detail.

FIG. 2 shows, in a strongly schematized form, a section of an air-oil system 19 of the jet engine 1 which comprises the auxiliary unit gear appliance 13 with the auxiliary units 16, the oil separator 17 and the tank device 18. Further, in the present case also strongly schematized bearing chambers 20, 21 are shown, to which oil from the tank device 18 is applied for the purpose of lubrication and cooling during operation of the jet engine 1.

An air-oil volume flow or an air-oil mixture can respectively be conducted via a conduit 22 or 23 from the front bearing chamber 20 and the rear bearing chamber 21 in the direction of a common conduit 28, which in turn opens into the tank device 18 or the oil tank. Connected to the tank device 18 is a conduction device that is embodied as a conduit 29 here and via which in the present case an air-oil volume flow is supplied to the oil separator 17 from the tank device 18.

A porous area 26, through which the air-oil volume flow flowing out of the tank device 18 can flow, is arranged in a rotatable manner in an interior space of the oil separator 17. In the present case, the porous area 26 can be driven by the auxiliary unit gear appliance 13 via a gear wheel 27, and acts as a centrifuge in order to be able to reduce the share of the oil in the air-oil volume flow flowing through the porous area 26 as far as possible. Here, the share of oil in the air-oil volume flow is reduced in the oil separator 17 in the area of the porous area 26 on the one hand like when an impact filter is passed, and on the other hand by separating the oil from the air like in the area of a centrifuge through the rotation of the porous area 26. The oil that is filtered out of the air-oil volume flow in the area of the porous area 26 is suctioned off in the exterior area of the oil separator 17 by means of a pumping appliance in a manner that is not shown in any more detail, and is conducted back into the tank device 18. The air flow that is flowing out from the oil separator 17 in the direction of the environment 50 has an oil load that is reduced with respect to the oil load of the air-oil volume flow that is supplied to the oil separator 17.

Figure 3:
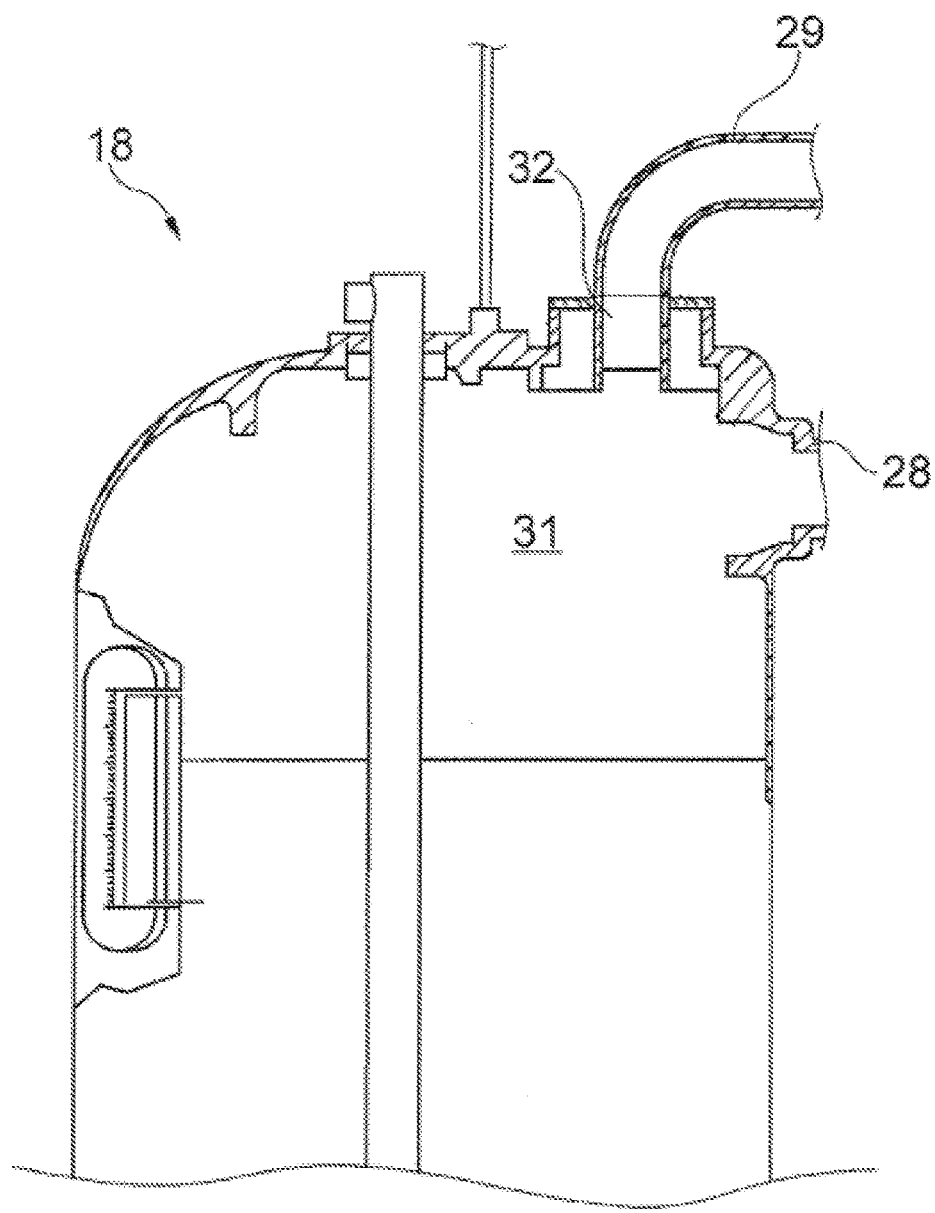
FIG. 3 shows a simplified sectional view of the tank device with the valve device of the air-oil system according to FIG. 1 and FIG. 2.

In FIG. 3, the tank device 18 is shown in more detail. An air-oil volume flow is supplied to the tank device 18 via the conduction device that is formed as a conduit 28, and is conducted into an interior space 31 of the tank device 18. In the present case, the conduit 29 adjoins the tank device 18 in an upper area of the tank device 18, wherein a valve device 32, which is described in more detail in FIG. 4 to FIG. 7, is arranged in the connection area of the conduit 29 to the tank device 18.

Figure 12:
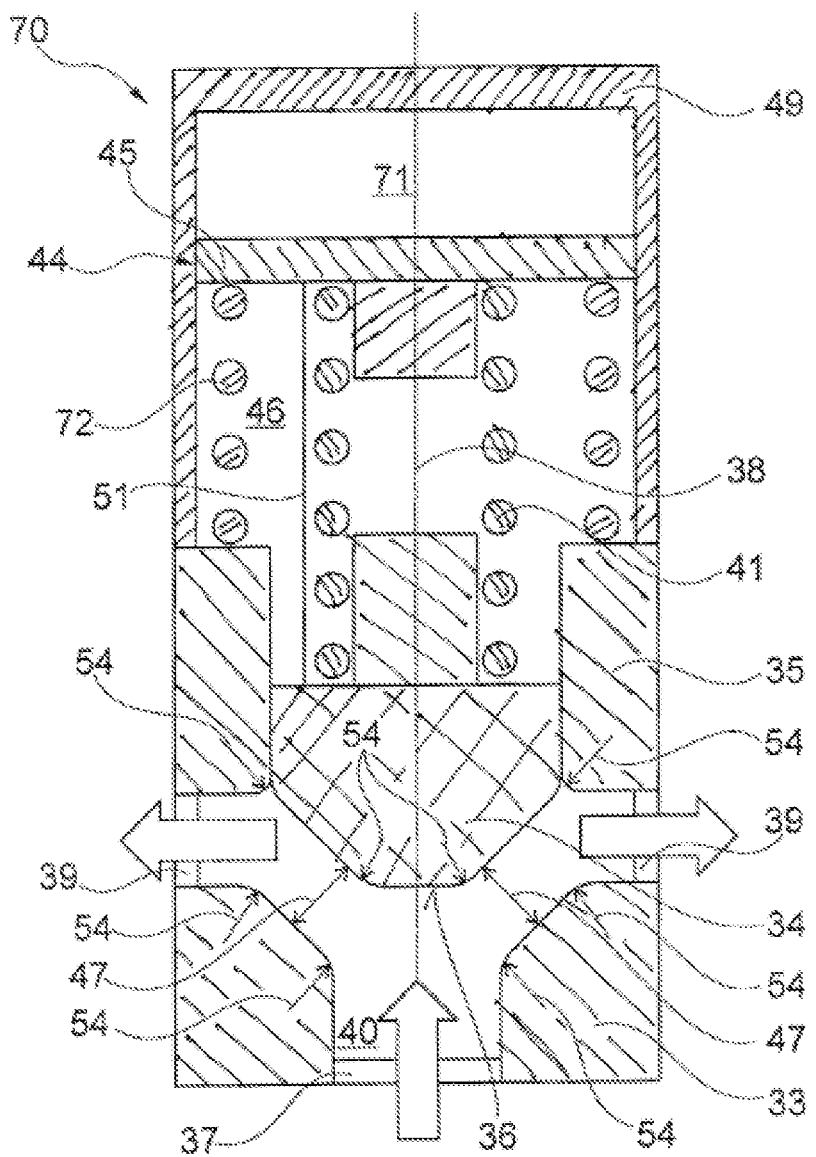
Figure 13:
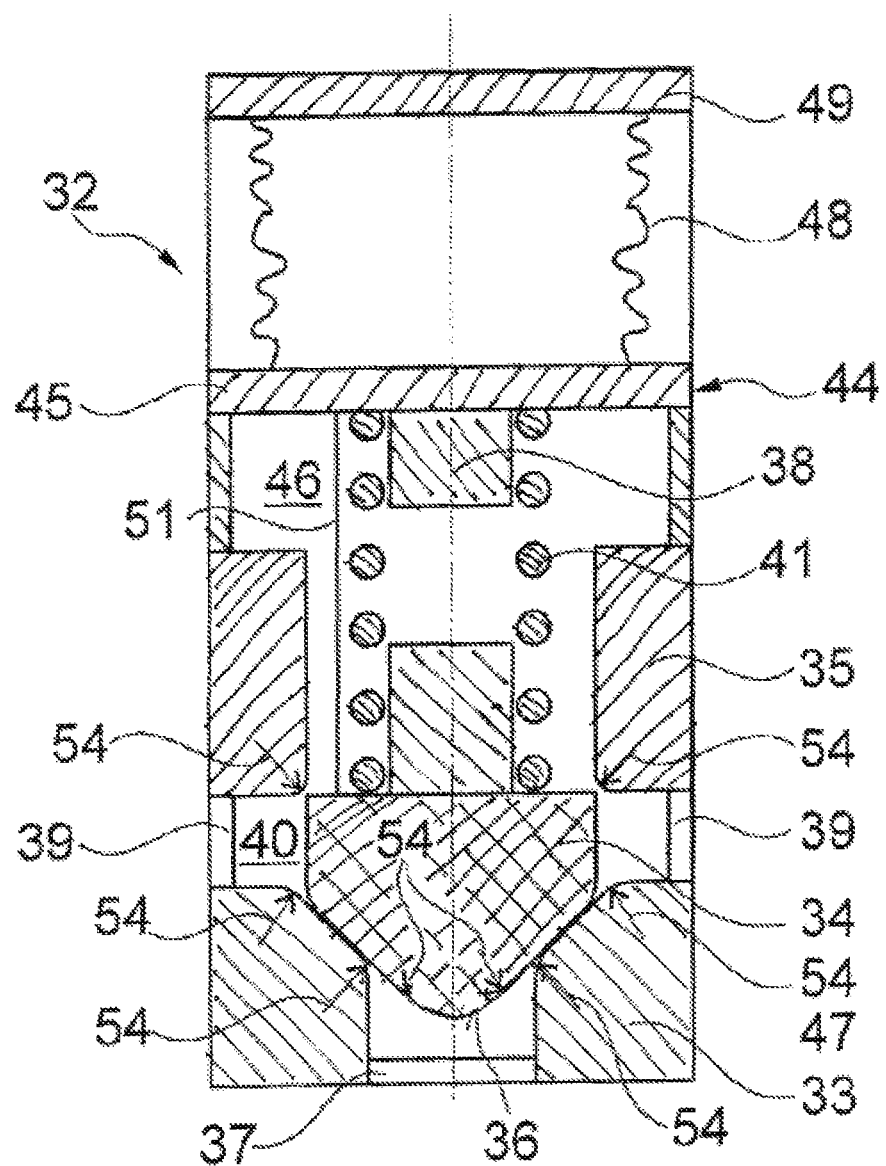
Figure 14:
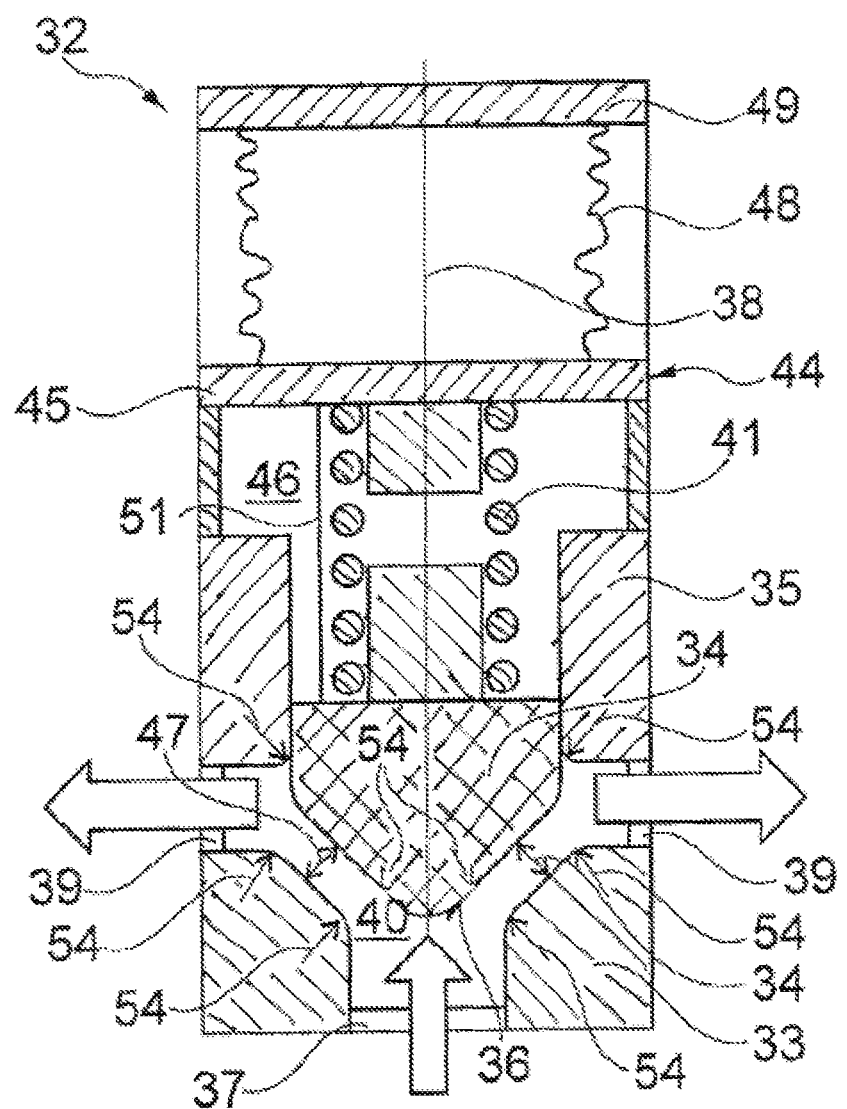
Figure 15:
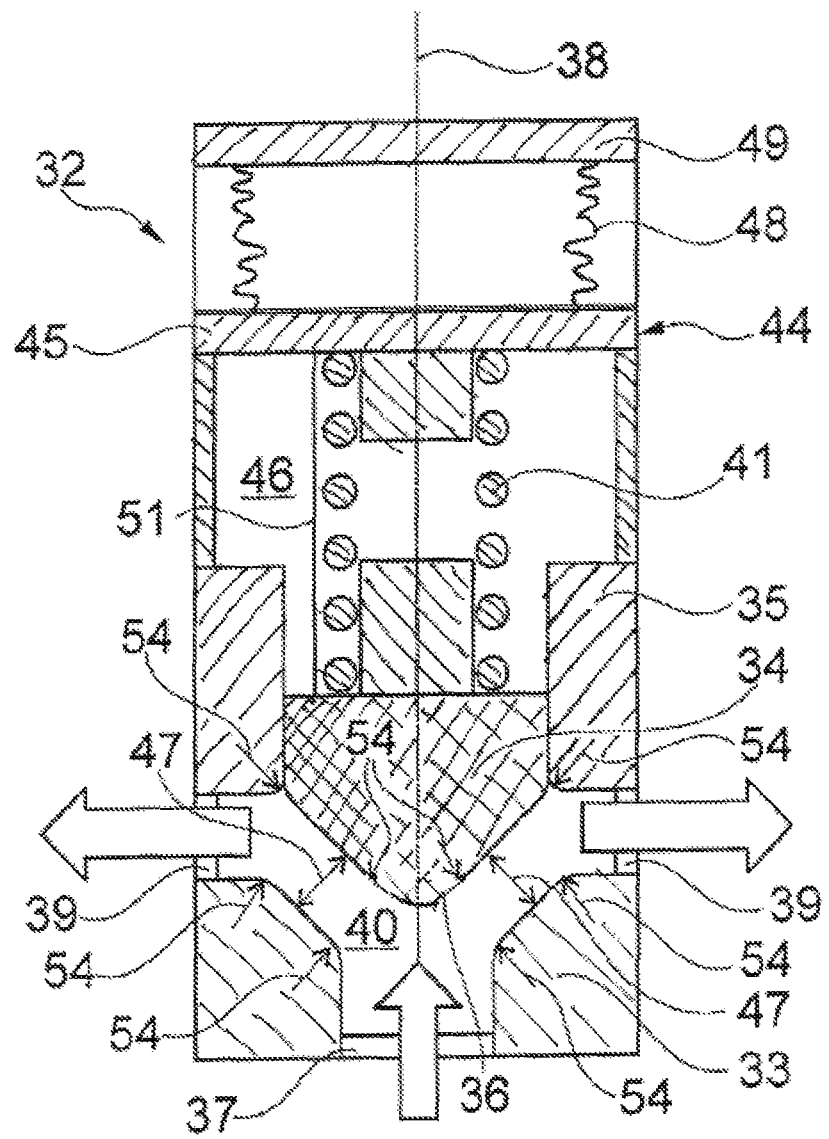

FIGS. 8 to 10 show simplified sectional views of an alternatively embodied valve device, wherein the valve body of the valve device is shown in positions that correspond to those in FIG. 5 to FIG. 7;

FIGS. 11-12 show simplified sectional views of another alternatively embodied valve device, wherein the valve body of the valve device is shown in positions that correspond to those shown in FIG. 5 and FIG. 7 or FIG. 8 and FIG. 10; and FIGS. 13-15 show simplified sectional views of another alternatively embodied valve device, wherein the valve body of the valve device is shown in positions that correspond to those shown in FIGS. 8-10.

Figure 4:
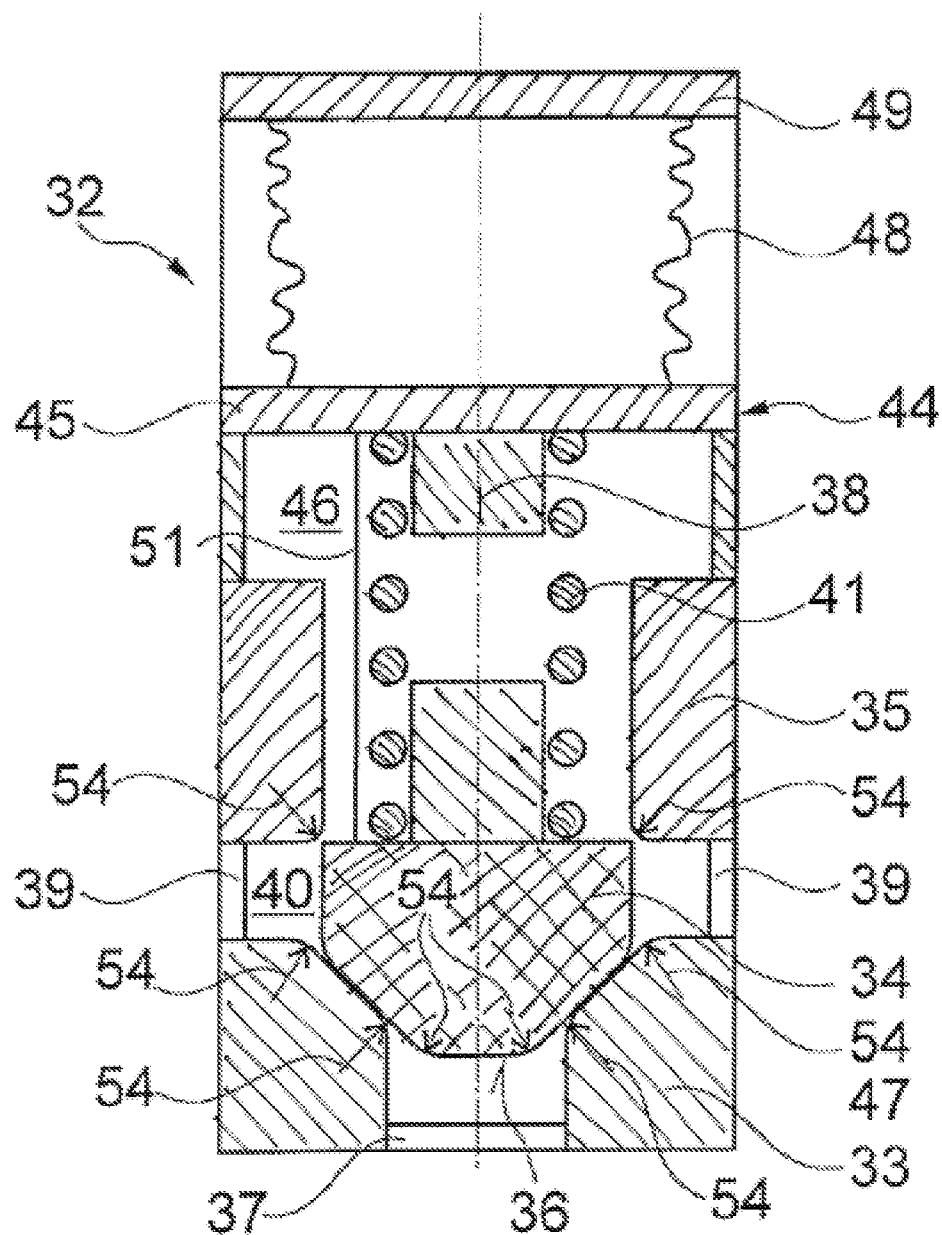
FIG. 4 shows a simplified sectional view of the valve device according to FIG. 3 in isolation, wherein a valve body of the valve device is shown in an operational state in which a flow path is closed by the valve device, or in a closed position.

In addition, the valve device 32 has a spring appliance 41 that applies a force to the valve body 34, by which the valve body 34 is pressed into its operational state or into its closed position, which is shown in FIG. 4 and in which it acts together with the valve seat 33 and closes the flow path 40 between the valve inlet 37 and the outlet openings 39. With the valve body 34 and the valve seat 33 acting together, any passing of the flow through the flow path 40 is avoided in the closed position of the valve body 34. Due to the air-oil volume flow that continues to be supplied to the tank device 18, the pressure increases in the interior space 31 of the tank device 18.

As shown in a schematic manner in FIG. 7, the wall 35 that comprises the outlet openings 39 is arranged inside a housing 42 that in the present case also has a circular cross-section. The wall 35 and the housing 42 are arranged substantially concentrically with respect to the central axis 38, so that the wall 35 and the housing 42 delimitate an annular space 43. The housing 42 forms a valve outlet 52 of the valve device 32, which in the present case has a discharge opening that has a circular flow cross-section. In the area of the discharge opening, the conduit 29 is connected to the valve device 32.

Since the housing 42 forms a part of the valve device 32, the flow path 40 of the valve device 32 extends from the valve inlet 37 up to the valve outlet 52. As an alternative hereto, the housing 42 can for example be formed by an adjoining structural component that is embodied with a bore.

If an air-oil volume flow is supplied via the conduit 28 to the tank device 18 during operation of the jet engine 1, and if the valve body 34 is in closed position, the pressure increases in the interior space 31 of the tank device 18. In this way, a force that is acting on a front surface 36 of the valve body 34 in the opening direction of the valve device 32 increases, counteracting the spring force of the spring appliance 41 that acts at the valve body 34.

If the opening force that results from the pressure present in the interior space 31 of the tank device 18 exceeds the spring force of the spring appliance 41, the valve body 34 is shifted counter to the spring force of the spring appliance 41 from its closed position into an operational state in which the flow path 40 is at least partially opened, or into an open position, which is shown in an exemplary manner in FIG. 5. When the valve device 32 is opened, an air-oil volume flow is conducted from the interior space 31 of the tank device 18 to the valve outlet 52 through the valve inlet 37 and the flow path 40 as well as via the outlet openings 39 and the annular space 43, and from there is conducted on via the conduit 29 in the direction of the oil separator 17.

If the valve body 34 is in an open position and an air-oil volume flow flows through the valve device 32, the pressure decreases inside the interior space 31 of the tank device 18. As soon as the force that results from the pressure that is applied to the valve body 34 is smaller than the spring force of the spring appliance 41, the valve body 34 is re-transferred into its closed position through the spring force of the spring appliance 41, whereby the valve device 32 is closed and a flow is prevented from passing the flow path 40 of the valve device 32.

Further, the valve device 32 has a setting device 44 with a setting element 45 that together with the valve body 34 and the wall 35 delimits a chamber 46 that forms the interior space of the valve device 32. Here, a bellows 48 is arranged on a side of the setting element 45 that is facing away from the valve body 34, with the bellows 48 being embodied in an air-tight manner and having a defined volume. On the one side, the bellows 48 is connected to the setting element 45 and, on the other side, to a wall 49 that is arranged at a side of the setting element 45 that is facing away from the valve body 34. Depending on the external pressure, the bellows 48 changes an extension or a height in the direction of the central axis 38, so that a distance between the wall 49 and the setting element 45 can be varied by means of the bellows 48.

The states of the valve device 32 that are shown in FIG. 4 and FIG. 5 occur during flight operation at a lower ambient pressure. Here, the setting element 45 is held in a first position by the spring force of the bellows 48 or by the pressure inside the bellows 48 and inside the chamber 46. This results from the fact that the pressure inside the chamber 46 that corresponds to the ambient pressure has a value that is too low to move the setting element 45 against the spring force of the bellows 48.

As the flying altitude decreases, the pressure inside the chamber 46 that corresponds to the ambient pressure of the jet engine 1 increases. If a force that results from the pressure inside the chamber 46 and that is applied to the setting element 45 exceeds the spring force of the bellows 48, the setting element 45 is shifted into a second position that is shown in more detail in FIG. 6.

The setting element 45 is connected to the valve body 34 via a collar 51 that is only shown in a schematic manner, wherein the collar 51 surrounds the valve body 34 at least in certain areas. The collar 51 facilitates a movement of the valve body 34 between its closed position and its open position. In addition, the collar 51 is designed in such a manner that the valve body 34 is in the first position of the setting element 45 and in its closed position, with a low pressure of the tank device 18 being applied to the valve body 34. If the setting element 45 is shifted into its second position, the collar 51 moves the valve body 34 together with the setting element 34 into the open position that is shown in FIG. 6, in which the flow path 40 is opened also without a corresponding pressure being applied in the interior space 31 of the tank device 18, and in which the air-oil volume flow can flow from the valve inlet 37 in the direction of the valve outlet 52.

The functionality of the oil pump can also be insured in a simple manner if the flow path 40 is opened, if the spring force of the bellows 48 is chosen in such a manner that the flow path is opened only if a pressure inside the interior space 31 of the tank device 18 is sufficiently high for providing a desired conveying capacity of the oil pump.

Here, it can be set at which atmospheric pressure—which correlates with a flying altitude—the setting element 45 is shifted between its first position and its second position based on the chosen spring force of the bellows 48. For example, the bellows 48 can be embodied in such a manner that the setting element 45 is transferred from the second position into the first position in the event that a flying altitude of approximately 6000 meters or more is exceeded, and is transferred from the first position into the second position in the event that the flying altitude falls below this height.

In principle, oil droplets are reduced in size to a lesser degree when flowing through the flow path 40 in the area of the valve device 32 in the second position of the setting element 45, in which the valve body 34 opens the flow path 40 independently of an actuating power which is acting thereat and which results from the spring force of the spring appliance 41 and the pressure in the oil tank 18 that is respectively applied to the valve body 34, than in an operational state of the valve device 32 in which the setting element 45 is in the first position. This is due to the fact that the flow path 40 is permanently opened by the valve body 34 in the second position of the setting element 45 due to the continuing actuation of the valve body 34 by the setting appliance, and that the oil droplets are subject to a lesser mechanical load and are atomized to a lesser degree as they flow through the valve device 32.

In contrast to this, a mechanical impact on the droplet size of oil droplets that are conducted through the valve device 32 or through its flow path 40 in the opened operational state of the valve device 32, with the setting element 45 being present in its first position, is higher, since in this case the valve body 34 is adjusted between a position in which the flow path 40 is opened and its closed position only depending on the actuating power which acts thereat and which results from the spring force of the spring appliance 41 and the pressure that acts in the interior space 31 of the oil tank 18 and performs an oscillating movement in the course of unfavorable operational states. Such an oscillating movement of the valve body 34 increases the degree of atomization of the oil droplets that are conducted through the valve device 32, because, on the one hand, they are accelerated to an undesired degree in the area between the valve body 34 and the valve seat 33 that is acting together therewith inside the flow cross-section of the flow path 40 which varies in that case, and, on the other hand, are subject to increased mechanical loads.

Due to the fact that, in the area of the oil separator 1, it is easier to separate larger oil droplets than smaller oil droplets from the air-oil volume flow that is supplied to the oil separator 17 based on aspects of functionality, the cleaned air that is discharged into the environment 50 has a lower oil load downstream of the oil separator 17 in the second position of the setting element 45 than in the first position of the setting element 45. In this manner, the occurrence of a so-called oil mist is avoided in the second position of the setting element 45.

A degree of atomization or decrease in size of the oil droplets of the air-oil volume flow that is conducted through the valve device 32 is very small with the valve device 32 in the second position of the setting element 45 also due to the fact that a flow cross-section of the flow path 40 is larger or equal to 80%, in particular 100%, of the flow cross-section of the valve inlet 37 in every area. Through this measure, an undesirably strong acceleration of the air-oil volume flow in the area of the valve device 32 is avoided in a simple manner, whereby a breakdown of larger oil droplets into smaller oil droplets is avoided, or is at least very low.

The flow cross-section in the flow path 40 can for example be calculated in the area of the valve body 34 and of the valve seat 33 by summing up surfaces that are identified more specifically by the reference sign 47 in FIG. 5, FIG. 6, FIG. 9, FIG. 10 and FIG. 12.

In order to further minimize the decrease in size of the oil droplets of the air-oil volume flow that is conducted through the valve device 32 in the first position or in the second position of the setting element 45, areas of the valve device 32 that adjoin the flow path 40 that connects the valve inlet 37 to the valve outlet 52, in particular the surfaces of the valve seat 33 and of the valve body 34, have no sharp edges, but are rather embodied with radii of curvature 54 through which in particular planar surface areas that are adjoining the flow path 40, preferably of the valve seat 33 and of the valve body 34, are connected to each other. In order to prevent the decrease in oil droplet size in a particularly effective manner, the radii of curvature 54 are embodied so as to be as large as possible. Here, the radii of curvature 54 are larger than the value of the flow cross-section of the valve inlet 37 divided by 150 and larger than 1.5 mm. The radii of curvature 54 are preferably embodied so as to be as large as possible.

In the present case, a surface of the valve body 34 that is facing towards the valve seat 33 is embodied in a spherical manner (see FIGS. 13-15), wherein the valve seat 33 is adjusted to the shape of the valve body 34. Also in this way, a breakdown of large oil droplets into smaller oil droplets can be advantageously reduced as the air-oil volume flow flows through the valve device 32.

FIG. 8 to FIG. 10, and FIG. 11 and FIG. 12 respectively show further valve devices 60 or 70, which will be described in more detail in the following. At that, only the differences of the valve devices 60, 70 to the valve device 32 will be discussed.

The valve device 60 differs from the valve device 32 in that the setting device 44 has an electromagnetic actuator 61 and a further spring appliance 62 on a side of the setting element 45 that is facing away from the valve body 34. By means of the actuator 61, which can be actuated by an engine control unit of the jet engine 1, the setting element 45 can be actively shifted between the first position and the second position, so that the valve body 34 can be shifted between the basic position and the open position independently of any currently acting external pressure.

In the shown embodiment, the further spring appliance 62 is supported at the setting element 45 as well as at the wall 49, so that the setting element 45 is in its first position when the actuator 61 is not actuated. In order to transfer the setting element 45 from the first position into the second position, the actuator 61 is selected in such a manner that a magnetic element 63 that is arranged in the area of the setting element 45 and a magnetic element 64 that is arranged in the area of the wall 49 attract each other counter to the spring force of the further spring appliance 62, and in particular in such a manner that they come into abutment with each other according to FIG. 10.

In the valve device 70 a pressure chamber 71 is formed by the setting element 45, the wall 49 and the lateral wall 35, which can be supplied with compressed air or compressor air depending on the operational state. Further, an additional spring appliance 72 is provided, which on the one hand is supported at the setting element 45 and on the other hand at an element 73 that is connected to the wall 35 in a fixedly attached manner. Thus, the additional spring appliance 72 presses the setting element 45 in the direction of its second position, in which the valve body 34 opens the flow path through the valve device 70 independently of a pressure that is present in the interior space 31 of the tank device 18.

In the present case, the setting element 45 is in the second position in the unpressurized state of the pressure chamber 71, whereas the setting element 45 is present in its first position if the pressure chamber 71 is pressurized with compressor air.

It can also be provided that the pressure chamber 71 is supplied with compressor air in every operational state. Because the pressure of the compressor air decreases during a flight in a greater height, it can be achieved that the setting element 45 is shifted between the first position and the second position without a separate control if the spring force of the additional spring appliance 72 is chosen correspondingly.

In an embodiment of a valve device that is alternative hereto, it can also be provided that the valve body is present in its open position in the pressurized state of a pressure chamber, and that it is present in its closed position in the unpressurized state of the pressure chamber.

In alternative embodiments of the invention, the tank device and the oil separator can principally be arranged in any suitable area of the jet engine, wherein the tank device is connected to the oil separator in particular in the form of at least one conduit through which an air-oil volume flow that is discharged from the tank device via the valve device can be supplied to the oil separator.

PARTS LIST 1 aircraft engine, jet engine
2 bypass flow channel
3 inlet area
4 fan
5 engine core
6 compressor appliance
7 burner
8 turbine device
9, 10, 11 rotor device
12 engine shaft
13 auxiliary unit gear appliance 14 engine shroud
15 drive shaft
16 auxiliary units
16A inner gear
17 appliance for separating oil; oil separator
18 tank device; oil tank
19 air-oil system
20, 21 bearing chamber
22, 23 conduit
24 interior space of the auxiliary unit gear appliance
25 housing of the auxiliary unit gear appliance
26 porous area of the oil separator
27 gear wheel
28, 29 conduction device; conduit
31 interior space of the tank device
32 valve device
33 valve seat
34 valve body
35 wall
36 front surface of the valve body
37 valve inlet
38 central axis
39 outlet opening
40 flow path
41 spring appliance
42 housing
43 annular space
44 setting device
45 setting element
46 chamber
47 surface
48 appliance; bellows
49 wall
50 environment
51 collar
52 valve outlet
54 radius of curvature
60 valve device
61 actuator
62 further spring appliance
63, 64 magnetic element
70 valve device
71 pressure chamber
72 additional spring appliance

The invention claimed is:

1. A jet engine comprising:
a tank device for supplying an air-oil volume flow that carries oil droplets,
a separating appliance for separating the oil droplets from the air-oil volume flow,
a valve device arranged in an area of the tank device, the valve device comprising:
a valve inlet operatively connected to the tank device for receiving the air-oil volume flow from the tank device,
a valve outlet operatively connected to the separating appliance for supplying the air-oil volume flow to the separating appliance,
a flow path for the air-oil volume flow positioned between the valve inlet and the valve outlet,
a valve seat positioned in the flow path,
a valve body acting together with the valve seat and via which the flow path is closed and at least partially opened,
a setting device for adjusting a position of the valve body, the setting device including a setting element operatively engaged with the valve body to act together with the valve body, and which is movable between a first position and a second position, wherein in the first position, the valve body is moved into an operational state in which the flow path is closed, while in the second position, the valve body is moved into an operational state in which the flow path is open,
wherein a fluid pressure in the flow path acts on a front surface of the valve body exposed to the flow path to provide an actuating force to move the valve body toward the open second position,
wherein, in the operational state where the flow path is open, a flow cross-section of the flow path corresponds to at least 80% of a flow cross-section of the flow path in an area of the valve inlet across an entire extension of the flow path between the valve inlet and the valve outlet,
wherein areas of at least one chosen from the valve body and the valve seat that delimitate the flow path have respectively at least one radius of curvature, a value of the at least one radius of curvature corresponding to at least a one hundred fiftieth fraction of a value of the flow cross-section of the flow path in an area of the valve inlet,
wherein the at least one radius of curvature is at least 1.5 mm in size.

2. The valve device according to claim 1, wherein in the operational state where the flow path is open, a flow cross-section of the flow path corresponds to at least 100% of a flow cross-section of the flow path in an area of the valve inlet across an entire extension of the flow path between the valve inlet and the valve outlet.

3. The valve device according to claim 1, wherein the front surface of the valve body is at least partially spherical, at least in certain areas.

4. The valve device according to claim 1, wherein the actuator includes a bellows that delimits an air-tight hollow space, wherein a height of the bellows varies in a setting direction of the valve body depending on an ambient pressure of the bellows.

5. The valve device according to claim 1, wherein the actuator includes a pressure chamber to which compressed air can be applied and which is delimited by the setting element at least in certain areas.

6. The valve device according to claim 1, and further comprising a spring appliance applying a spring force on the setting element in a direction of the open second position.

7. The valve device according to claim 1, and further comprising a spring appliance applying a spring force on the valve body in a direction of the closed first position.

8. The valve device according to claim 1, and further comprising a wall surrounding the valve body and the valve seat at least in certain areas and that includes outlet openings arranged downstream of the valve seat with respect to the valve inlet and spaced at a distance from each other in a circumferential direction.

9. The valve device according to claim 8, and further comprising a housing, wherein the wall is arranged radially inside and coaxial to the housing, and wherein the wall is arranged at a distance from the housing in a radial direction, wherein the housing includes at least one discharge opening of the valve outlet.

10. The valve device according to claim 1, and further comprising:

an actuator configured for:
- applying a closing force to the setting element to overcome the actuating force to move the valve body toward the closed first position, and
- adjusting the closing force to the setting element to allow the valve body to move toward the open second position based on at least one chosen from an ambient pressure and independently of the actuating force.

11. The valve device according to claim 10, wherein the actuator includes an electromagnetic actuator.

* * * * *